United States Patent [19]

Nokovitch

[11] Patent Number: 5,435,341
[45] Date of Patent: Jul. 25, 1995

[54] DEVICE FOR SEAL-TIGHT CLOSURE AND CONNECTION OF A CHAMBER TO AN EXTERNAL PIPE SYSTEM, AND A CHAMBER EQUIPPED WITH AN AFOREMENTIONED DEVICE

[75] Inventor: Boris Nokovitch, Colombes, France

[73] Assignee: Capry, Colombes, France

[21] Appl. No.: 193,595

[22] Filed: Feb. 9, 1994

[30] Foreign Application Priority Data

Feb. 10, 1993 [FR] France .................. 93 01469

[51] Int. Cl.6 ........................................ F16K 51/00
[52] U.S. Cl. ........................ 137/321; 251/144; 222/552
[58] Field of Search ............ 251/144, 215, 216; 137/321; 222/83, 552

[56] References Cited

U.S. PATENT DOCUMENTS 4,071,012 1/1978 Cooke .................. 137/321
4,142,546 3/1979 Sandau .................. 137/321

Primary Examiner—Martin P. Schwardron
Assistant Examiner—Kevin L. Lee
Attorney, Agent, or Firm—Armstrong, Westerman, Hattori, McLeland & Naughton

[57] ABSTRACT

The device comprises a valve body (6) mounted in seal-tight manner through the wall (7) of a chamber (3) and a shutter (4) received in the body, and means (4) for selective seal-tight connection of the chamber (3) to a pipe system (5) with the shutter in an open position.

The connecting means (4) comprise a removable sleeve (18) adapted to be externally secured in seal-tight manner to the body (6), and a means (23, 31) for actuating the shutter (7), mounted for rotation in the sleeve (18) so as to move the shutter in the sleeve between a closed position and the aforementioned open position in which the chamber (3) communicates with the pipe system (5) via the body (6) and the sleeve (18).

9 Claims, 3 Drawing Sheets

DEVICE FOR SEAL-TIGHT CLOSURE AND CONNECTION OF A CHAMBER TO AN EXTERNAL PIPE SYSTEM, AND A CHAMBER EQUIPPED WITH AN AFOREMENTIONED DEVICE

The invention relates to a device for seal-tight closure and connection of a chamber to an external pipe system.

It is known to protect stored materials against corrosion by enclosing them in seal-tight chambers kept at a high vacuum or filled with an inert gas. In some cases, inter alia when storing machines or components of machines, it is necessary to evacuate or inject a gas into the chamber after the cover, such as a flexible cover, has been hermetically sealed around the equipment for storage. In such cases it is essential to be able to connect the chamber to external piping for initial processing of the equipment and, if required, maintain it under a suitable atmosphere if stored for a long period.

The invention aims to provide a reliable, inexpensive device which is simple in design and easy to use, for seal-tight closure of a chamber and selective connection thereof to external piping.

To this end, the invention relates to an aforementioned device, comprising a valve body mounted in sealing-tight manner through a wall of the chamber, a shutter received in the body, and means for selectively and sealingly connecting the chamber to the pipe system in a position where the shutter is open, characterised in that the connecting means comprise a movable sleeve adapted to be externally and sealingly secured to the body and a means for actuating the shutter rotatably mounted in the sleeve so as to move the shutter in the sleeve between a closed position and the aforementioned open position in which the chamber communicates with the pipe system via the body and the sleeve.

Other features and advantages of an embodiment of the invention will be clear from the following description given by way of example only and illustrated by the accompanying drawings in which.

Figure 1:
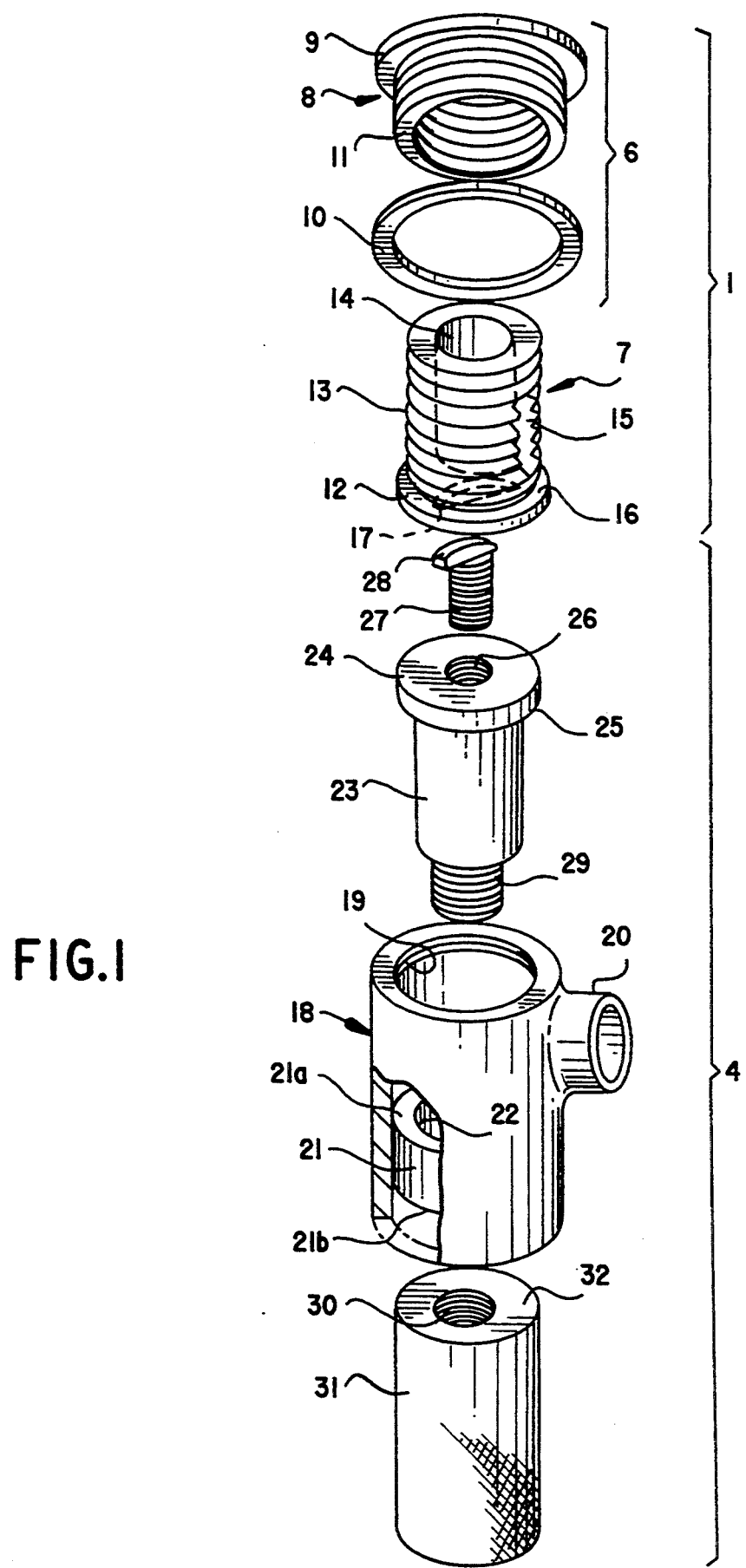
FIG. 1 is a cut-away perspective view of a device in accordance with the invention.

In the drawings, the device comprises a valve 1 mounted in seal-tight manner in a wall 2 of a chamber 3, and a device 4 for connecting the chamber 3 to external piping 5.

The valve 1 has a body 6 and a shutter 7. The body 6 comprises a ring 8 in the form of an internally and externally threaded cylindrical tube and adapted to be fitted through a hole in the wall 2 having substantially the same diameter as the outer diameter of the ring 8. At one end, the ring 8 has an annular collar 9 for bearing against the inner surface of the wall 2 at the periphery of the aforementioned hole, whereas an annular nut 10 having an outer diameter substantially equal to that of the collar 9 can be externally screwed on to the ring 8. The wall 2 is clamped between the collar 9 and the annular nut 10, optionally with interposition of a seal 9a, so as to seal the wall 2 to the body 6. The length of the threaded part of the ring 8 is substantially greater than the combined thickness of the wall 2 and the annular nut 10, so that when the body 6 is mounted on the wall 2, a part of the threaded end of the ring 8 projects externally beyond the annular nut 10.

The end 11 of the ring 8 remote from the collar 9 forms a seat which the shutter 7 can abut when the valve 1 is in the closed position. The shutter 7 has a head 12 bearing a cylindrical part 13 which is externally threaded for screwing into the ring 8. The cylindrical part 13 of the shutter 7, starting from its end opposite the head 12, has an axial bore 14 communicating with a transverse orifice 15 formed near the head 12 through the wall of the cylindrical part 13. The latter has a length such that its external thread remains partially engaged in the inner thread of the ring 8 when the shutter is brought to an open position where the orifice 15 is completely uncovered beyond the seat 11.

The head 12 is in the form of a disc having an outer diameter slightly greater than the diameter of the tubular part 13 at the crests of the thread, but not greater than the outer diameter of the ring 8 at the roots of the thread. Accordingly, on the side of a tubular part 13, the head 12 defines an annular shoulder 16 adapted to be clamped against the annular seat 11 of the ring 8 so as to close the valve 1 in seal-tight manner when the shutter 7 is screwed all the way into the body 6.

The outer surface of the head 12 has a groove or indentation 17 enabling the shutter 7 to be screwed and unscrewed by a screwdriver or the connecting device 4 as described hereinafter. The groove 17 is for example in the form of a cavity having straight sides and a cylindrical or hemispherical bottom.

The connecting device 4 comprises a cylindrical tubular sleeve 18 threaded at one end at 19 so as to be screwed on to the outer part of the ring 8 projecting beyond the annular nut 10. The sleeve 18, near its threaded end 19, has a transverse tubular socket 20 for sealingly connecting its internal space to the external piping 5. The sleeve 18 contains a cylindrical annular component 21 having a smooth cylindrical inner wall 22 constituting a surface in which a piston or slide 23 can slide or rotate, whereas the facing flat surfaces 21a and 21b of the component 21 form abutments limiting the travel of the slide 23.

The slide 23 is in the form of a solid cylindrical component having an outer diameter suitable for sliding and rotation with friction in the annular component 21. At one end, the slide 23 terminates in a larger-diameter surface 24 defining a shoulder 25 adapted to abut the surface 21a so as to limit the travel of the slide 23 inside the sleeve 18. On the side of the widened surface 24, the slide 23 is axially formed with a threaded blind hole 26 adapted to receive a threaded cylindrical component 27 which at one end has a projection 28 which matches the size and dimensions of the groove 17. At the end opposite the surface 24, the slide 23 terminates in a smaller-diameter threaded axial prolongation 29 adapted to be received in a threaded blind hole 30 formed axially in one end of a cylindrical handle 31. Over at least a part of its cylindrical outer wall, the handle is formed with serrations, indentations or similar means for preventing the user's hand from slipping when he uses the handle 31 for locking or releasing the shutter 7 as described hereinafter. The outer diameter of the handle 31 is not greater than the inner diameter of the sleeve, and greater than the inner diameter of the annular component 21, so that its end face formed with the hole 30 defines a shoulder 32 adapted to abut the surface 21b of the annular component 21 so as to limit the travel of the slide 23 in the direction for moving it out of the sleeve 18.

The connecting device 4 also comprises two O-rings 33 and 34 (not shown in FIG. 1) mounted on the slide 23 on either side of the annular component 21. Preferably the sleeve 18 is made of polyvinyl chloride whereas all the other components of the valve and of the connecting device are made of "DELRIN" or another polyacetal.

In order to fit together the connecting device 4, the threaded component 27 is screwed all the way into the hole 26 until the projection 28 is pressed against the end of the slide 23. This embodiment of the projection 28, which is a component subject to wear, can easily be replaced periodically.

Next, the O-ring 33 is placed on the slide 23, and the slide is inserted into the sleeve 18, starting from its end 19. During this movement, the O-ring 33 is pushed by the surface 21a until it abuts the shoulder 25. The end of the slide 23 adjacent its threaded part 29 then projects from the sleeve on the side opposite the socket 20, and the O-ring 34 can be placed on it and the handle 31 can be screwed on to the threaded end 29. When the handle 31 is pushed all the way into the sleeve, the O-ring 34 is pushed by the surface 21b against the shoulder 32 and the two seals 33 and 34 are then in position.

Since the body is secured in seal-tight manner through the wall 2 when the chamber 3 is constructed, the shutter 7 can be operated either by a conventional tool such as a screwdriver or by the connecting device 4. In the latter case, the threaded end 19 of the sleeve 18 is screwed to the projecting part of the ring 8 until the tightening produces the required sealing-tightness.

Figure 2:
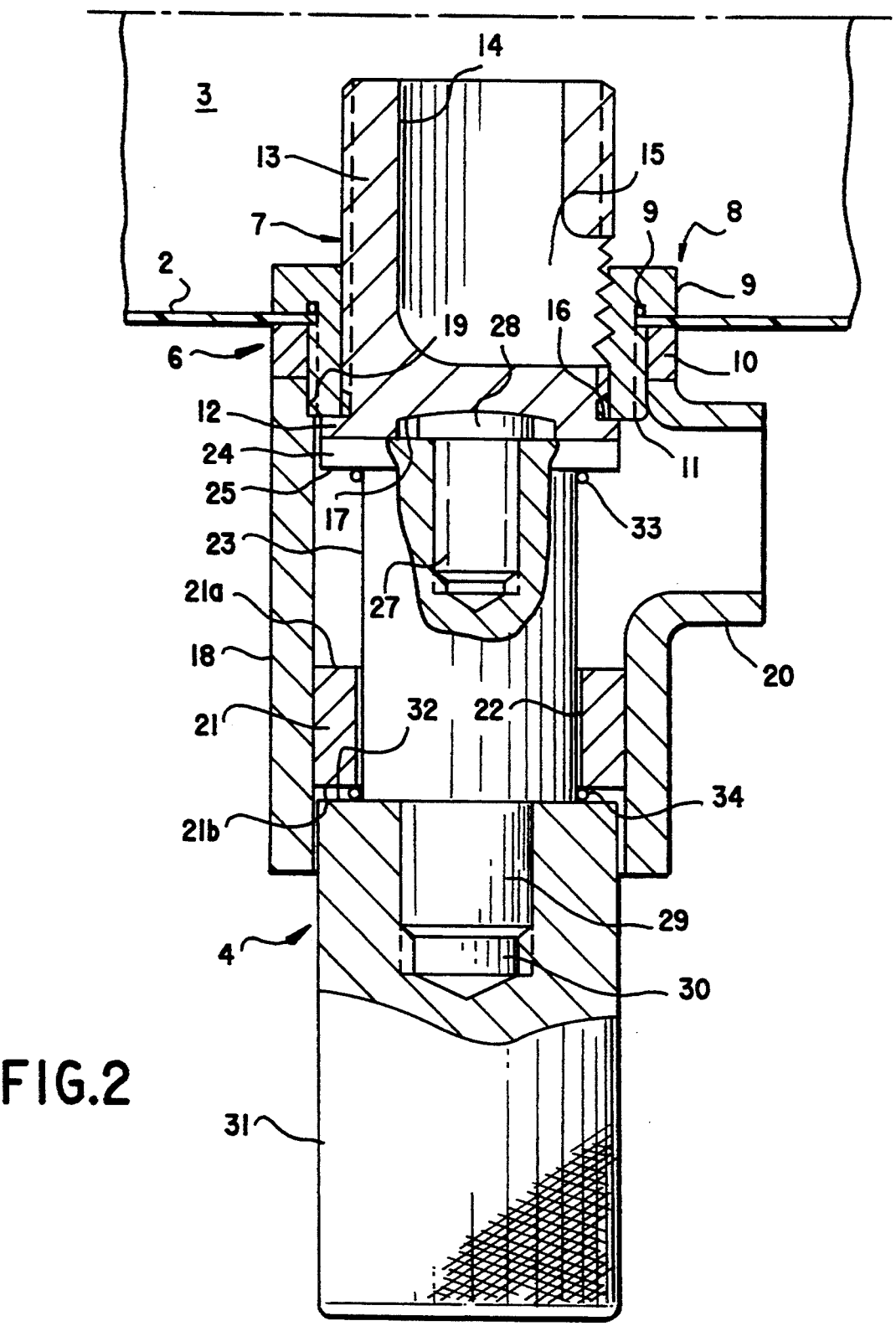
FIG. 2 is an axial sectional view of the device, the connecting device being mounted on the valve with the shutter in the closed position.
Figure 3:
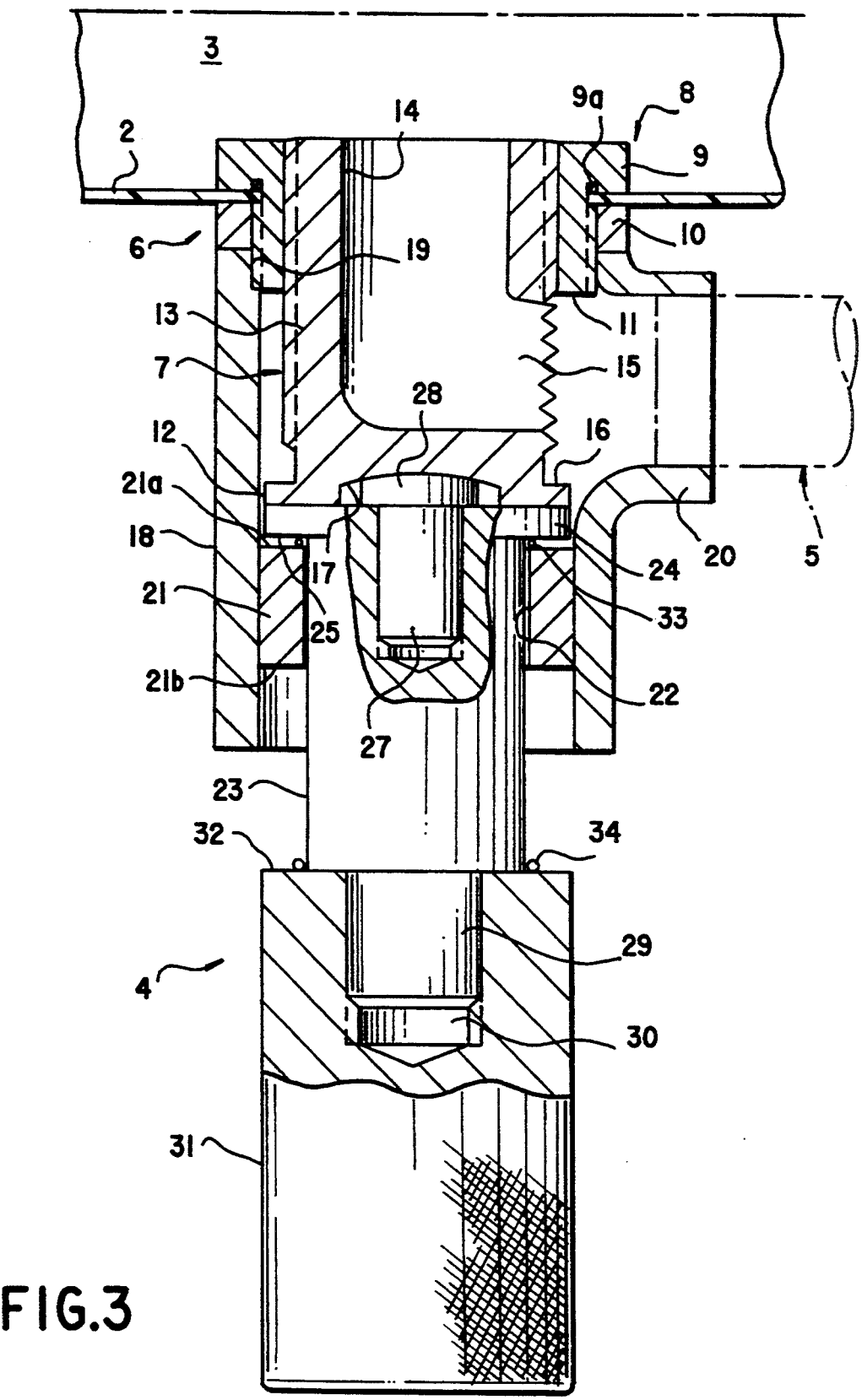
FIG. 3 is an axial sectional view similar to FIG. 2, showing the shutter in the open position for connecting the chamber to an external pipe system.

If the shutter 7 is then in the closed position as shown in FIG. 2, the slide 23 is rotated by means of the handle 31 until the projection 28 fits in the groove 17. If this has not yet been done, the socket 20 is connected to the external piping 5 by any suitable means for making a seal-tight connection.

When the connection has been made, the shutter 7 is unscrewed by rotating the handle 31 in the desired direction, as with an ordinary screwdriver. During the unscrewing process, the orifice 15 communicates with the interior of the sleeve and the piping 5 and the movement is continued until the shoulder 25 abuts the surface 21a with interposition of the O-ring 33. The length of the shutter 7 is such that, in the aforementioned open position, it remains screwed in the ring 8. Consequently the loosening torque exerted by the user on the handle 31 has the effect of compressing the seal 33 between the shoulder 25 and the surface 21a, thus obtaining seal-tightness between the slide 23 and the annular component 21. The abutting position is chosen so that the orifice 15 is the in line with the socket 20, so that the chamber 3 is connected in seal-tight manner to the pipe system 5.

In order to close the valve 1, the handle 31 is rotated in the direction for screwing the shutter 7 in the ring 8, until the shoulder 32 compresses the seal 34 against the surface 21b as shown in FIG. 2. The axial position where the shoulder 32 abuts the surface 21b is chosen so that the tightening torque of the shutter 7 in the body 6 is limited to the desired value for sealing- tightness and suitable in the closed position of the valve 1.

Of course, the aforementioned embodiment is only an example and could be modified, inter alia by substitution of technical equivalents, without thereby departing from the invention. For example one or more lip or other seals could be provided between the slide 23 and the annular component 21 and/or between the surface 24 and the inner wall of the sleeve 18 in order to improve the seal-tightness of the connecting device during the time for changing from the open position to the closed position of the shutter, and vice versa. Preferably, in order to limit leaks during the transition between opening and closing, the travel of the shutter takes place over a smaller number of revolutions of the slide, so that the shutter 7 is given a wide thread pitch.

The device according to the invention is advantageously used with an enclosure or flexible protective cover having excellent barrier properties against moisture and any inert gas used to fill the chamber, and excellent strength regarding resistance to tearing and resistance to shocks, avoiding the need for additional components for packaging of components or machines.

One example of a suitable material for constructing an aforementioned chamber or protective covering is a composite material comprising:
(a) at least one laminate comprising a number of polyolefin-based drawn crosswise plies, each ply being formed by co-extrusion and blow moulding of a number of layers which may vary in composition depending on their required properties (weldability and adhesion),
(b) an extruded connecting layer having high adhesive power,
(c) a thin aluminium sheet,
(d) an extruded connecting layer having high adhesive power, and
(e) a layer of metal-coated polyester, the metal-coated surface facing the aluminium sheet.

In a preferred embodiment:
the aforementioned component (a) comprises two aforementioned laminates connected by an extruded connecting layer such as a layer of low-density polyethene or the like, and each layer of laminate comprises four plies each made up of three layers based on a mixture of incompatible polymers, for example a mixture of polyethene and polypropene or a mixture of polyethene and an elastomer, the central layer making up 70–80% of the total of the three layers and the outer layers each making up 10–15% of the total,
the connecting layer (b) is a layer of an ethene polymer mixture and a filler for smoothing the surface of the aluminium sheet so as to increase adhesion or alternatively, if the surface of the aluminium sheet is of good quality, a layer of an ethene and lower alkyl (meth)acrylate copolymer,
the aluminium sheet (c) has a thickness of about 20 μm,
the connecting layer (d) is a layer of an ethene and lower alkyl (meth)acrylate copolymer and
the layer (e) is a sheet of aluminium-coated polyethene terephthalate having a thickness of about 12 μm.

By way of example, the various components can have the following approximate unit weights:
Each laminate in component (a): 150 g/m$^2$
Intermediate connecting layer between the two laminates: 20 g/m$^2$
Layer (b) 20 g/m$^2$
Sheet (c) 54 g/m$^2$
Layer (d) 20 g/m$^2$
Layer (e) 17 g/m$^2$
Total weight approximately 431 g/m$^2$.

A composite material of this kind provides a total barrier against moisture and inert gases including helium and is remarkably resistant to mechanical stress such as impacts and tearing.

The laminate used in component (a) is produced by co-extrusion of three layers in the form of a tube which is blow-moulded at a relatively low blow-up ratio (1:1 to 1.5:1) and longitudinally drawn to obtain a uniaxial orientation. The blow-moulded tube is flattened, cut in a helix and unfolded to form a flat sheet oriented at an angle to the longitudinal direction of the sheet. Four sheets are then combined, with their directions of orientation crosswise, into a film which is rolled and drawn (e.g. at 2.25:1) bi-directionally at a relatively low temperature. Details of this kind of laminate and preparation thereof can be found in GB-A-1 526 722, GB-A-1 526 723 and GB-A-1 526 724, the teaching of which is incorporated here for reference.

Note that the order in which various components of the composite material are given is not limitative and could be reversed.

I claim:

1. A device for seal-tight closure and connection of a chamber to an external pipe system, comprising a valve body mounted in seal-tight manner through a wall of the chamber, a shutter received in the body, and means for selectively and sealingly connecting the chamber to the pipe system with the shutter in an open position, characterized in that the connecting means (4) comprise a movable sleeve (18) adapted to be externally and sealingly secured to the body (6) and a means (23, 31), for actuating the shutter (7), rotatably mounted in the sleeve (18) so as to move the shutter in the sleeve between a closed position and the aforementioned open position in which the chamber (3) communicates with the pipe system (5) via the body (6) and the sleeve (18);

said shutter (7) has a head (12) bearing an externally threaded cylindrical part (13) received in a threaded bore on the body (6), and the head (12) and the actuating means (23, 31) comprise complementary coupling means (17, 28) for rotating the shutter (7) via the actuating means (23, 31);

said cylindrical part (13), starting from its end remote from the head (12), has an axial bore (14) communicating with a transverse orifice (15) formed near the head (12); and said sleeve (18) has a lateral socket (20) for connecting to the pipe system (5) and adapted to be substantially aligned with the transverse orifice (15) in the open position of the shutter (7).

2. A device according to claim 1, characterised in that the complementary coupling means comprise an indentation (17) and a projection (28) of complementary shape and size, one being formed in the head (12) and the other at an end (24) of the actuating means (23, 31).

3. A device according to claim 2, characterised in that the projection (28) is borne by a movable cylindrical component (27) screwed into the end (24) of the actuating means.

4. A device for seal-tight closure and connection of a chamber to an external pipe system, comprising a valve body mounted in seal-tight manner through a wall of the chamber, a shutter received in the body, and means for selectively and sealingly connecting the chamber to the pipe system with the shutter in an open position, characterized in that the connecting means (4) comprise a movable sleeve (18) adapted to be externally and sealingly secured to the body (6) and a means (23, 31), for actuating the shutter (7), rotatably mounted in the sleeve (18) so as to move the shutter in the sleeve between a closed position and the aforementioned open position in which the chamber (3) communicates with the pipe system (5) via the body (6) and the sleeve (18);

said shutter (7) has a head (12) bearing an externally threaded cylindrical part (13) received in a threaded bore on the body (6), and the head (12) and the actuating means (23, 31) comprise complementary coupling means (17, 28) for rotating the shutter (7) via the actuating means (23, 31);

said actuating means (23, 31) is mounted for rotating and sliding within the sleeve (18); and said sleeve (18) and said actuating means (23, 31) comprise complementary abutment means (21a, 25; 21b, 32) which define the closed and open position respectively of the shutter (7).

5. A device according to claim 4, characterised in that the complementary abutment means comprise a fixed annular component (22) inside the sleeve (18) and having opposite flat surfaces (21a, 21b) cooperating with two respective shoulders (25, 32) of the actuating means.

6. A device according to claim 4, characterised in that the complementary coupling means comprise an identation (17) and a projection (28) of complementary shape and size, one being formed in the head (12) and the other at an end (24) of the actuating means (23, 31).

7. A device according to claim 6, characterized in that the projection (28) is borned by a movable cylindrical component (27) screwed into the end (24) of the actuating means.

8. A device for seal-tight closure and connection of a chamber to an external pipe system, comprising a valve body mounted in seal-tight manner through a wall of the chamber, a shutter received in the body, and means for selectively and sealingly connecting the chamber to the pipe system with the shutter in an open position, characterized in that the connecting means (4) comprise a movable sleeve (18) adapted to be externally and sealingly secured to the body (6) and a means (23, 31), for actuating the shutter (7), rotatably mounted in the sleeve (18) so as to move the shutter in the sleeve between a closed position and the aforementioned open position in which the chamber (3) communicates with the pipe system (5) via the body (6) and the sleeve (18); and said body (6) comprises an externally threaded ring (8) and an annular nut (10) to clamp the body (6) to the wall (2).

9. A device according to claim 8, characterised in that the sleeve (18) has a threaded end (19) for screwing onto the ring (8) for sealingly securing the connecting means (4) to the body (6).

* * * * *